(12) United States Patent
Byun et al.

(10) Patent No.: US 8,512,895 B2
(45) Date of Patent: Aug. 20, 2013

(54) SECONDARY BATTERY HAVING AN ELECTRODE TERMINAL PENETRATING THROUGH AND ELECTRICALLY INSULATED FROM A CAP PLATE

(75) Inventors: Sang-Won Byun, Suwon-si (KR); Yong-Sam Kim, Suwon-si (KR); Sung-Bae Kim, Suwon-si (KR); Byung-Kyu Ahn, Suwon-si (KR)

(73) Assignees: Samsung SDI Co., Ltd., Suwon-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/805,342

(22) Filed: Jul. 27, 2010

(65) Prior Publication Data
US 2011/0104562 A1    May 5, 2011

(51) Int. Cl.
*H01M 2/02* (2006.01)

(52) U.S. Cl.
USPC ............. 429/181; 429/65; 429/161; 429/171; 429/180; 429/185

(58) Field of Classification Search
USPC .............. 429/185, 178–181, 65, 161, 171
See application file for complete search history.

(56) References Cited

U.S. PATENT DOCUMENTS

| | | | | |
|---|---|---|---|---|
| 4,075,368 A * | 2/1978 | Salamon et al. | | 429/161 |
| 4,775,604 A * | 10/1988 | Dougherty et al. | | 429/178 |
| 6,143,442 A * | 11/2000 | Takahashi et al. | | 429/179 |
| 6,156,452 A * | 12/2000 | Kozuki et al. | | 429/211 |
| 6,979,514 B2 * | 12/2005 | Kometani et al. | | 429/161 |
| 2001/0004505 A1 * | 6/2001 | Kim et al. | | 429/180 |
| 2003/0104276 A1 * | 6/2003 | Mizuno et al. | | 429/181 |
| 2003/0194609 A1 * | 10/2003 | Nam et al. | | 429/181 |
| 2003/0207172 A1 * | 11/2003 | Misra et al. | | 429/181 |
| 2005/0118501 A1 * | 6/2005 | Hashimoto et al. | | 429/180 |
| 2005/0191555 A1 * | 9/2005 | Kelley et al. | | 429/245 |
| 2005/0238955 A1 * | 10/2005 | Hooke et al. | | 429/181 |
| 2006/0115727 A1 * | 6/2006 | Kim et al. | | 429/181 |
| 2008/0038627 A1 * | 2/2008 | Yamauchi et al. | | 429/53 |
| 2009/0186269 A1 * | 7/2009 | Kim et al. | | 429/179 |
| 2010/0143786 A1 * | 6/2010 | Kim | | 429/158 |
| 2010/0167107 A1 * | 7/2010 | Byun et al. | | 429/56 |

FOREIGN PATENT DOCUMENTS

| | | |
|---|---|---|
| JP | 2000-251945 | 9/2000 |
| JP | 2008-066254 A | 3/2008 |
| JP | 2009-104971 | 5/2009 |
| KR | 10-2001-0017098 A | 3/2001 |

OTHER PUBLICATIONS

Korean Office Action in KR 10-2009-0104308, dated Mar. 23, 2011 (Byun, et al.).

* cited by examiner

*Primary Examiner* — Ula C Ruddock
*Assistant Examiner* — Amanda Barrow
(74) *Attorney, Agent, or Firm* — Lee & Morse, P.C.

(57) ABSTRACT

A secondary battery includes an electrode assembly and an electrolyte solution in a case, a current collection unit in the case and electrically connected to the electrode assembly, a cap plate coupled to an open side of the case for sealing the case, an electrode terminal penetrating the cap plate through a terminal hole to be exposed to an exterior of the case, the electrode terminal being electrically connected to the current collection unit, and an insulation unit separating the cap plate from the electrode terminal and the current collection unit, the insulation unit being configured to block penetration of the electrolyte solution therethrough toward the cap plate.

14 Claims, 7 Drawing Sheets

SECONDARY BATTERY HAVING AN ELECTRODE TERMINAL PENETRATING THROUGH AND ELECTRICALLY INSULATED FROM A CAP PLATE

BACKGROUND

1. Field

Example embodiments relate to a secondary battery. More particularly, example embodiments relate to a secondary battery having an electrode terminal penetrating through and electrically insulated from a cap plate.

2. Description of the Related Art

A secondary battery, i.e., a rechargeable battery, is a battery capable of being charged and discharged. The rechargeable battery may be used in high-technology electronic devices, e.g., in cellular phones, notebook computers, camcorders, etc., and in vehicles.

The rechargeable battery may include an electrode assembly and an electrolyte solution in a case. Further, electrode terminals may be electrically connected to the electrode assembly in the case, and may extend outside the case of the rechargeable battery.

SUMMARY

Embodiments are directed to a secondary battery, which substantially overcomes one or more of the problems due to the limitations and disadvantages of the related art.

It is therefore a feature of an embodiment to provide a secondary battery with an insulation unit structure configured to block an electrolyte solution from reaching a cap plate, thereby preventing an electric short between the cap plate and electrode terminals via the electrolyte solution.

At least one of the above and other features and advantages may be realized by providing a secondary battery, including a case for containing an electrode assembly together with an electrolyte solution, a current collection unit for being electrically connected to the electrode assembly in the case, a cap plate for sealing the case by being coupled to an open side of the case, an electrode terminal for being electrically connected to the current collection unit, and exposed to an outer space by partially penetrating the cap plate, and an insulation unit for electrically separating the cap plate from the electrode terminal, wherein the insulation unit blocks the electrolyte solution so as to prevent an electric short occurring between the cap plate and the electrode terminal via the electrolyte solution. A terminal hole for penetration by the electrode terminal may be formed in the cap plate.

The insulation unit may include an upper gasket partially inserted from outside the cap plate into the terminal hole, a seal gasket partially inserted from inside the cap plate into the terminal hole, and an insulation member interposed between the cap plate and the current collection unit.

The seal gasket may seal the terminal hole in which the electrode terminal is inserted. A portion of the seal gasket may be inserted into a through hole formed in the insulation member. The insulation member and the seal gasket may be in non-flat surface contact in the through hole of the insulation member, thereby sealing the through hole of the insulation member.

The seal gasket may support the insulation member with respect to the cap plate. A portion of the insulation member may be between the seal gasket and the cap plate. Opposite surfaces of the insulation member may contact the seal gasket and the cap plate.

The seal gasket may include a terminal hole insert unit inserted into the terminal hole, a cap support unit connected to the terminal hole insert unit, inserted into the through hole of the insulation member, and having a surface supported by the cap plate, and support base connected to the cap support unit, the support base having a first surface contacting the insulation member and a second surface contacting the current collection unit.

The insulation member may include a cap support unit supported by the cap plate, a cap insert unit formed on a surface of the cap support unit, wherein the surface is supported by the cap plate, and inserted into a support groove that is formed along an inner surface of the cap plate, a contact unit stepped in the through hole of the insulation member, thereby supporting the support base, and a lead support unit stepped in a different manner in the through hole of the insulation member, thereby contacting the current collection unit. The support base may include a contact unit contacting the contact unit of the insulation member, thereby sealing the through hole formed in the insulation member, and a lead support unit contacting the current collection unit.

The insulation member may support the seal gasket with respect to the cap plate. A portion of the seal gasket may be between the insulation member and the cap plate. Opposite surfaces of the seal gasket may contact the insulation member and the cap plate.

The seal gasket may include a terminal hole insert unit inserted into the terminal hole, a support base connected to the terminal hole insert unit and inserted into a through hole in the insulation member, the support base having a first surface contacting the cap plate and a second surface contacting a stepped surface structure in the through hole of the insulation member, and a lead support unit having a first surface contacting the support base and a second surface contacting the current collection unit.

The insulation member may include a cap support unit supported by the cap plate, a cap insert unit formed on a surface of the cap support unit, wherein the surface is supported by the cap plate, and inserted into a support groove that is formed along an inner surface of the cap plate, a contact unit stepped in the through hole of the insulation member, thereby supporting the support base, and a lead support unit stepped in a different manner on an opposite surface of the contact unit in the through hole of the insulation member, thereby contacting the current collection unit. The support base may include a cap support unit connected to the terminal hole insert unit, inserted into the through hole formed in the insulation member, and supported by the cap plate, and a contact unit contacting the contact unit of the insulation member, thereby sealing the through hole formed in the insulation member.

The current collection unit may include a current collector contacting an electrode plate of the electrode assembly, and a lead member having an end contacting the current collector, and another end contacting the electrode terminal. The upper gasket may include a terminal hole insert unit inserted into the terminal hole, and a protrusion unit protruding externally through the cap plate. The lead support unit of the seal gasket, and the lead support unit of the insulation member may contact with the lead member, respectively. The electrode assembly may include a first electrode plate, a separator, and a second electrode plate. The secondary battery may further include a first current collection unit and a second current collection unit that are electrically and respectively connected to the first electrode plate and the second electrode plate of the electrode assembly in the case. The secondary battery may further include a first electrode terminal electrically connected to the first current collection unit, and exposed to the outer space by partially penetrating the cap plate, wherein the first current collection unit is the current collection unit, and the first electrode terminal is the electrode terminal. The current collection unit may include the first current collection unit and the second current collection unit, and the electrode terminal comprises the first electrode terminal and a second electrode terminal that are electrically connected to the first current collection unit and the second current collection unit, respectively, and that are exposed to the outer space by partially penetrating the cap plate.

The insulation unit may include an insulation member and a seal gasket having a contact portion therebetween, the contact portion including a plurality of contact surfaces between the insulation member and the seal gasket. The contact portion may have a stepped structure. The insulation member may have a surface with a first stepped structure, and the seal gasket has a surface with a second stepped structure fitting into the first stepped structure of the surface of the insulation member. The seal gasket may be in direct contact with the insulation member, the cap plate, the electrode terminal, and the current collection unit. At least one surface contact between the seal gasket and the insulation member may be in a plane substantially parallel to the cap plate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
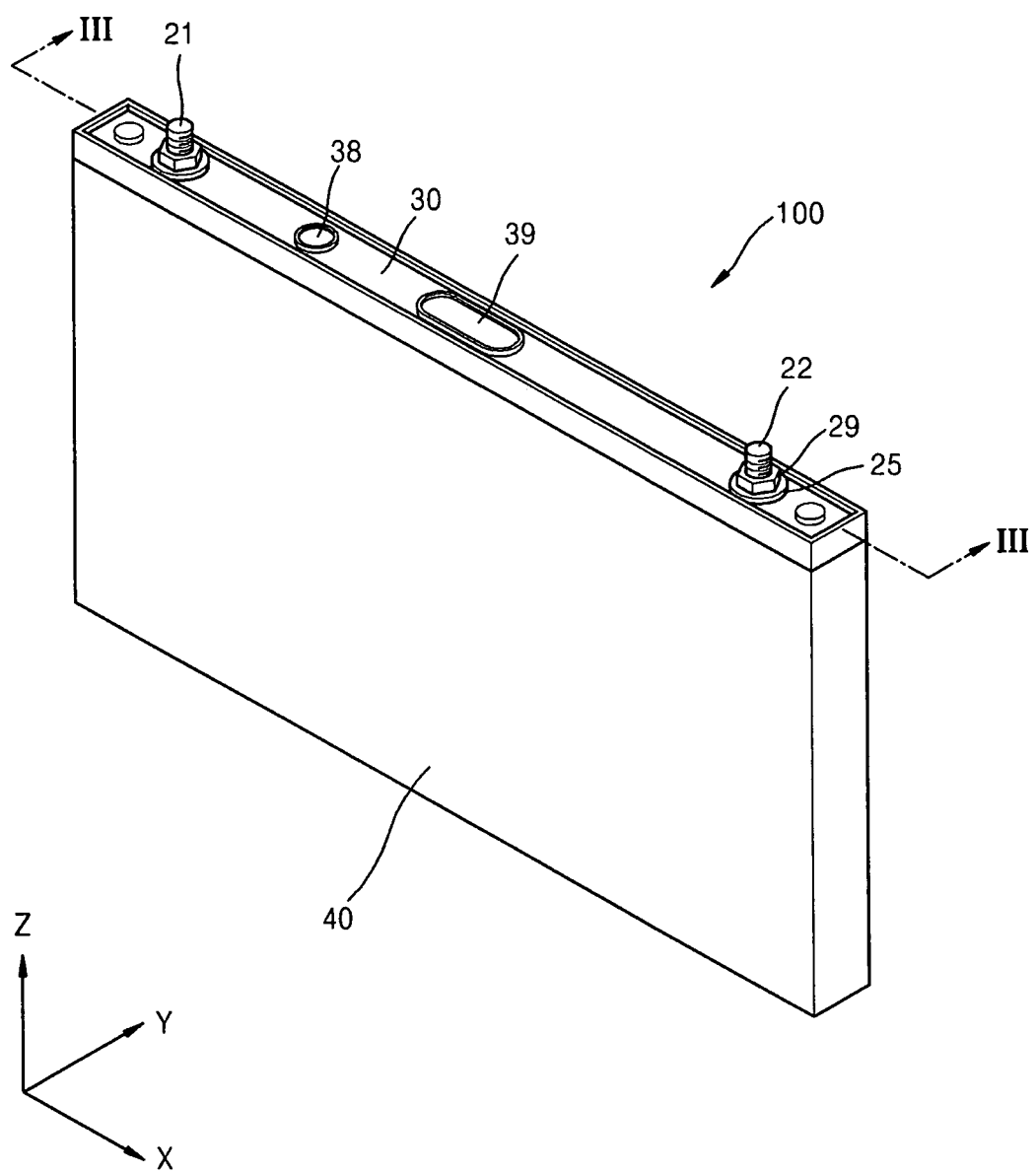
FIG. 1 illustrates a perspective view of a secondary battery according to an embodiment.

Korean Patent Application No. 10-2009-00104308, filed on Oct. 30, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
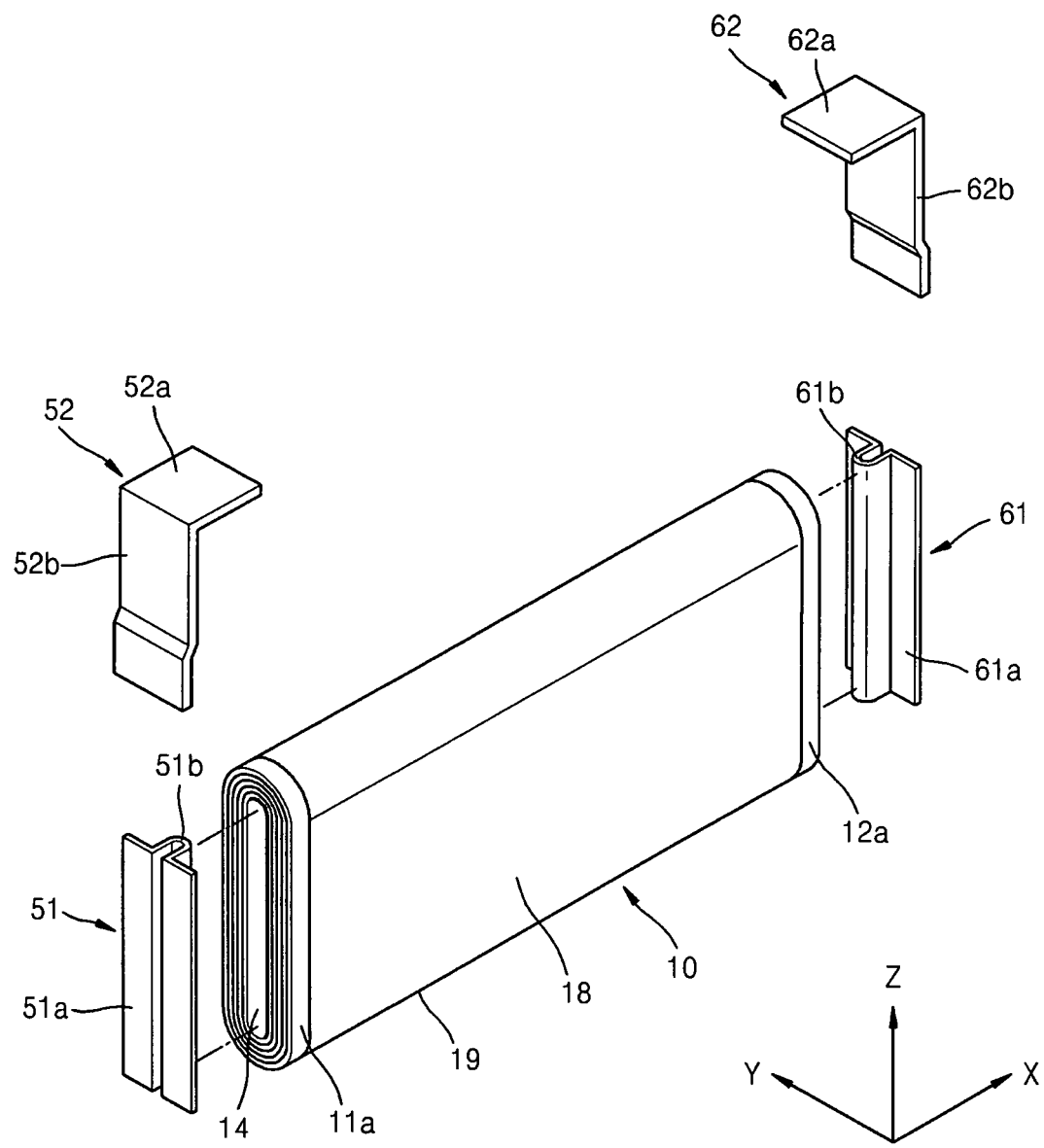
FIG. 2 illustrates a partial, exploded perspective view of current collectors and lead members in the secondary battery of FIG. 1.
Figure 3A:
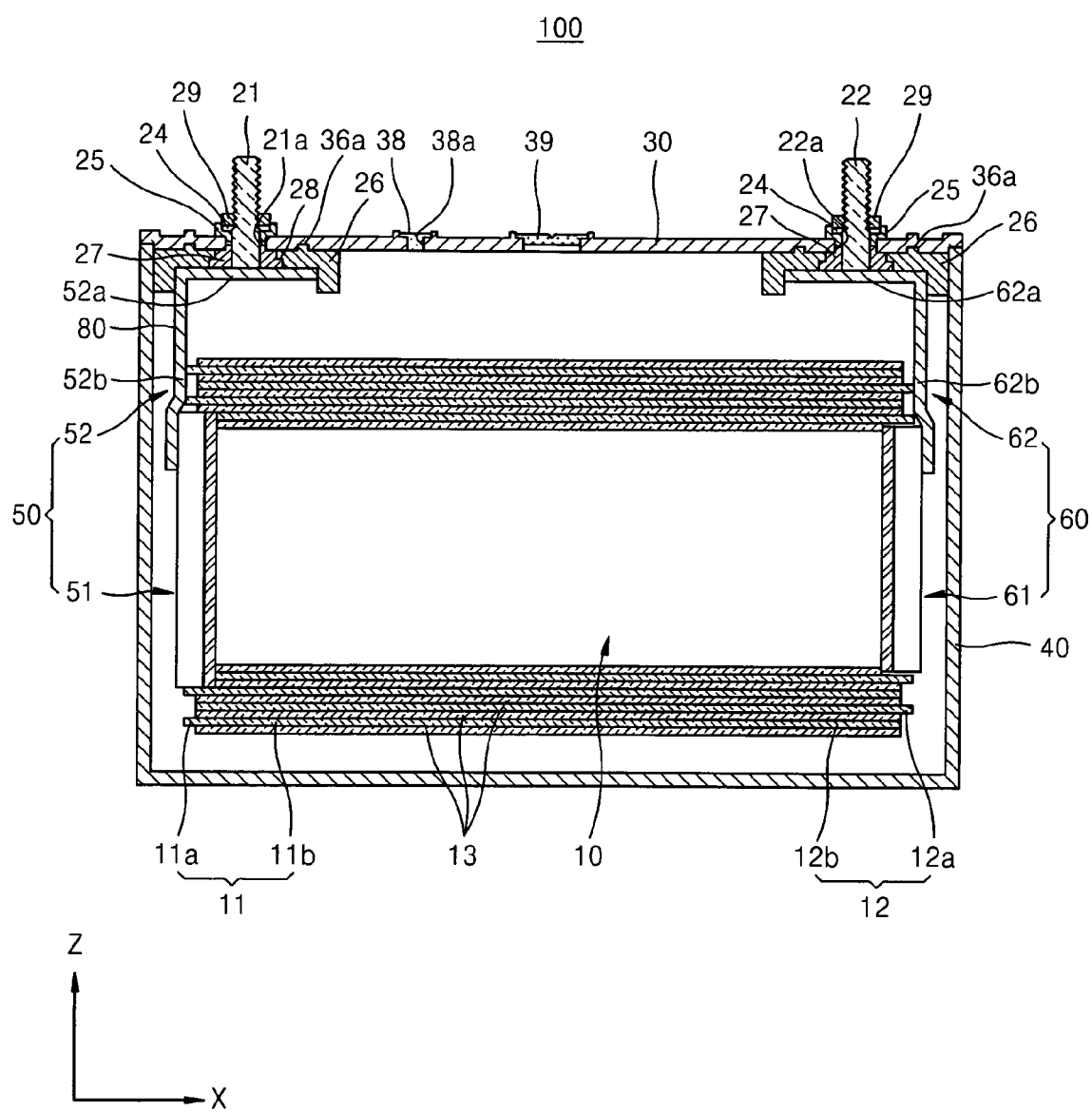
FIG. 3A illustrates a cross-sectional view along line of FIG. 1.

FIG. 1 illustrates a perspective view of a secondary battery 100 according to an embodiment. FIG. 2 illustrates a partial, exploded perspective view of current collectors and respective lead members, which are separated from an electrode assembly in the secondary battery 100 of FIG. 1. FIG. 3A illustrates a cross-sectional view along line of FIG. 1.

Referring to FIGS. 1 through 3A, the secondary battery 100 may include an electrode assembly 10, first and second electrode terminals 21 and 22, a cap plate 30, a case 40, first and second current collection units 50 and 60, and an insulation units. Here, as an example of the secondary battery 100, a lithium-ion secondary battery having an angular shape will be described. However, example embodiments are not limited thereto, and the secondary battery 100 may be, e.g., a nickel-cadmium secondary battery, a nickel-hydrogen secondary battery, a cylindrical-shaped battery, a pouch type battery, etc.

As illustrated in FIG. 3A, the electrode assembly 10 may include a first electrode plate 11, a separator 13, and a second electrode plate 12, and may be positioned in the case 40. The first and second current collection units 50 and 60 may be electrically connected between the electrode assembly 10 and respective first and second electrode terminals 21 and 22.

The first and second current collection units 50 and 60 may include current collectors 51 and 61 and lead members 52 and 62. The current collectors 51 and 61, e.g., respective anode and cathode current collectors, may contact the first and second electrode plates 11 and 12 of the electrode assembly 10, respectively. First ends of the lead members 52 and 62, e.g., respective anode and cathode lead members, may contact the current collectors 51 and 61, and second ends of the lead members 52 and 62 may contact the electrode terminals 21 and 22. The first and second current collection units 50 and 60, e.g., respective anode and cathode current collection units, may be electrically connected to the first electrode plate 11 and the second electrode plate 12, respectively. A detailed structure of the first and second current collection units 50 and 60 will be described in more detail below with reference to FIG. 2.

The electrode assembly 10 may be formed as a jelly roll, i.e., the first electrode plate 11, the separator 13, and the second electrode plate 12 may be rolled. That is, the first and second electrode plates 11 and 12 may be rolled by interposing the separator 13, i.e., an insulator, therebetween. For example, the first electrode plate 11, the second electrode plate 12, and the separator 13 may be cylindrically rolled and then pressed to have an outer circumferential surface of the electrode assembly 10 substantially flat, e.g., the electrode assembly 10 may be pressed to be plate-shaped and to have a flat portion 18 and a curved portion 19 as illustrated in FIG. 2. For example, the curved portion 19 may be formed so that the outer circumferential surface of the electrode assembly 10 is curved at both ends of the flat portion 18. It is noted, however, that the electrode assembly 10 is not limited thereto, e.g., the electrode assembly 10 may be formed by alternately stacking the first electrode plate 11, the separator 13, and the second electrode plate 12.

The first current collection unit 50 may contact the first electrode plate 11 that is exposed to a side end of the electrode assembly 10. Similarly, the second current collection unit 60 may contact the second electrode plate 12 that is exposed to another side end of the electrode assembly 10.

The first electrode terminal 21, e.g., an anode terminal, may be electrically connected to the first current collection unit 50, and a portion of the first electrode terminal 21 may be exposed to the outside by penetrating the cap plate 30. The second electrode terminal 22, e.g., a cathode terminal, may be electrically connected to the second current collection unit 60, and a portion of the second electrode terminal 22 may be exposed to the outside by penetrating the cap plate 30. First and second terminal holes 21a and 22a may be formed through the cap plate 30, so the first and second electrode terminals 21 and 22 may penetrate the cap plate 30 through respective terminal holes 21a and 22a. For example, the first electrode terminal 21 may protrude externally by penetrating the first terminal hole 21a, and the second electrode terminal 22 may protrude externally by penetrating the second terminal hole 22a.

In the secondary battery 100, the first electrode plate 11 may be, e.g., an anode, and the second electrode plate 12 may be, e.g., a cathode. Also, the first current collection unit 50 may be an anode current collection unit 50, and the second current collection unit 60 may be a cathode current collection unit 60. In addition, the first electrode terminal 21 may be an anode terminal 21, and the second electrode terminal 22 may be a cathode terminal 22. The anode terminal 21 and the cathode terminal 22 may be electrically connected to the anode plate 11 and the cathode plate 12 of the electrode assembly 10, respectively, thereby being exposed to the outside of the case 40.

The anode plate 11 and the cathode plate 12 may include uncoated portions 11a and 12a, and coated portions 11b and 12b, respectively. The uncoated portions 11a and 12a may refer to portions of the electrode plates that are formed of a thin metal foil and are not coated with an active material. The coated portions 11b and 12b may refer to portions of the electrode plates that are formed of the thin metal foil and are coated with the active material. The anode uncoated portion 11a may be formed on one side end of the anode plate 11 in a longitudinal direction (X direction) of the anode plate 11. The cathode uncoated portion 12a may be formed on another side end of the cathode plate 12 in a longitudinal direction (X direction) of the cathode plate 12.

The electrode assembly 10 and an electrolyte solution may be contained in the case 40, e.g., an angular-shaped can having an opening. The cap plate 30 may be coupled to an open side of the case 40 to seal the electrode assembly 10 and the electrolyte solution in the case 40. The cap plate 30 may cover the case 40 while allowing the first and second electrode terminals 21 and 22 to protrude externally therethrough. An interface between the case 40 and the cap plate 30 may be laser-welded, so that the case 40 having the electrode assembly 10 and the electrolyte solution may be sealed.

The cap plate 30 may be formed of a thin plate. The cap plate 30 may have an electrolyte solution injection hole 38a. After the electrolyte solution is injected into the case 40 via the electrolyte solution injection hole 38a, a sealing cap 38 may be inserted into the electrolyte solution injection hole 38a. Also, a vent member 39 having a groove formed therein may be mounted in the cap plate 30 so as to break open at a set internal pressure.

The insulation unit may electrically separate, i.e., insulate, the cap plate 30 from the electrode terminals 21 and 22. Here, the insulation unit may block the electrolyte solution to prevent an electric short between the cap plate 30 and the electrode terminals 21 and 22 via the electrolyte solution. The insulation unit may include an upper gasket 25, an insulation member 26, and a seal gasket 27.

The upper and seal gaskets 25 and 27 may be interposed between the cap plate 30 and the electrode terminals 21 and 22. That is, the upper gasket 25 may be partially inserted from outside the cap plate 30 into each one of terminal holes 21a and 22a, respectively. The seal gasket 27 may be partially inserted from inside the cap plate 30 into each one of the terminal holes 21a and 22a, respectively. The seal gasket 27 may seal the terminal holes 21a and 22a having the electrode terminals 21 and 22 inserted therein. In another embodiment, the upper gasket 25 and the seal gasket 27 may not be formed in electrode terminals 21 and 22, e.g., the first electrode terminal 21 may directly penetrate the first electrode terminal hole 21a without the upper gasket 25 and the seal gasket 27, thereby contacting the cap plate 30. Also, in this case, the cap plate 30 and the case 40 may have the same polarity as the first electrode terminal 21. A detailed structure of the insulation unit will be described in more detail below with reference to FIG. 4.

Washers 24 for absorbing a coupling force may be arranged on the upper gasket 25. Screw threads may be formed in the first and second electrode terminals 21 and 22, and may be coupled to nuts 29 through the washers 24. The nuts 29 may support the first and second electrode terminals 21 and 22 on the top of the cap plate 30. However, the first and second electrode terminals 21 and 22 are not limited thereto. For example, the first and second electrode terminals 21 and 22 may be formed as rivet-type electrode terminals protruding externally through the terminal holes 21a and 22a. In this case, the first and second electrode terminals 21 and 22 may be pressurized to be wide and flat, while the upper gaskets 25 may be inserted between the terminal holes 21a and 22a and the protruding portions of the electrode terminals 21 and 22 to fix the electrode terminals 21 and 22 to the cap plate 30.

As illustrated in FIG. 3A, the current collection units 50 and 60 may electrically connect the electrode assembly 10 to the electrode terminals 21 and 22. For example, the lead members 52 and 62 may extend parallel to the cap plate 30 to contact, e.g., directly contact, respective first and second electrode terminals 21 and 22. The insulation member 26 may be interposed between the cap plate 30 and each of the current collection units 50 and 60, e.g., each of the lead members 52 and 62. Here, the insulation member 26 may electrically separate the cap plate 30 from the first and second current collection units 50 and 60, and the first and second current collection units 50 and 60 may be supported by the cap plate 30 via the insulation members 26.

In detail, as illustrated in FIG. 3A, the first current collector 51 may be welded to the first uncoated portion 11a of the electrode assembly 10. The first current collector 51 may be electrically connected to the first electrode terminal 21 via the first lead member 52. Accordingly, the first electrode terminal 21 may be connected to the first electrode plate 11 of the electrode assembly 10 via the first lead member 52 and the first current collector 51.

Similarly, the second current collector 61 may be welded to the second uncoated portion 12a of the electrode assembly 10. The second current collector 61 may be electrically connected to the second electrode terminal 22 via the second lead member 62. Accordingly, the second electrode terminal 22 may be connected to the second electrode plate 12 of the electrode assembly 10 via the second lead member 62 and the second current collector 61.

The insulation member 26 may be arranged for insulation between the lead members 52 and 62, and the cap plate 30. As illustrated in FIG. 3, the lead members 52 and 62 may include terminal lead units 52a and 62a, and current collection lead units 52b and 62b. The terminal lead units 52a and 62a may be attached and electrically connected to the electrode terminals 21 and 22. The current collection lead units 52b and 62b may be attached and electrically connected to the current collectors 51 and 61.

The first electrode plate 11, the first current collector 51, and the first lead member 52 may be electrically connected to each other, and may be formed of the same material, i.e., aluminum (Al). Also, the second electrode plate 12, the second current collector 61, and the second lead member 62 may be electrically connected to each other, and may be formed of the same material, i.e., copper (Cu).

As illustrated in FIG. 2, when the electrode assembly 10 is pressed to be plate-shaped after being rolled, an internal space 14 having separated internal surfaces may be formed in a center of the electrode assembly 10. The current collectors 51 and 61 may include support protrusions 51b and 61b to be inserted into the internal space 14, and attachment plates 51a and 61a to be attached to side ends of the electrode assembly 10, e.g., via welding, while pressing the uncoated portions 11a and 12a.

In detail, the support protrusions 51b and 61b may extend from a center of a lateral direction, i.e., the y direction, of the current collectors 51 and 61 along a longitudinal direction, i.e., the x direction, of the current collectors 51 and 61. For example, each of the support protrusions 51b and 61b may have a U-shaped cross section when viewed in the xy-plane. A height, i.e., a distance along the z direction, and a width, i.e., a distance along the y direction, of the support protrusions 51b and 61b may correspond to height and width of the internal space 14 of the electrode assembly 10, respectively.

The support protrusions 51b and 61b may be inserted into the internal space 14 of the electrode assembly 10 to support the electrode assembly 10. Accordingly, the support protrusions 51b and 61b may prevent a loose contact between the electrode assembly 10 and the current collectors 51 and 61 due to an external shock. The support protrusions 51b and 61b may support the electrode assembly 10 in the longitudinal and lateral directions of the internal space 14, thereby stably supporting the electrode assembly 10.

The support protrusions 51b and 61b may have side ends formed to be connected to the attachment plates 51a and 61a. For example, when the support protrusions 51b and 61b are inserted into the space 14, the attachment plates 51a and 61a may extend, e.g., in the yz-plane, along side cross-sections of the electrode assembly 10, and may press the uncoated portions 11a and 12a in the side cross-sections of the electrode assembly 10. Here, the side cross-sections refer to cross-sectional surfaces that are perpendicular to a central axis of when the electrode assembly 10 is rolled.

Accordingly, the attachment plates 51a and 61a may contact respective uncoated portions 11a and 12a over a large area. Also, the attachment plates 51a and 61a may be attached to the side cross-sections of the electrode assembly 10 by laser-welding, so a thickness of the current collectors 51 and 61 may be larger than a thickness formed by ultrasonic welding, thereby reducing resistance of the current collectors 51 and 61. Also, since the current collectors 51 and 61 are fixed at side ends of the uncoated portions 11a and 12a, an output of the electrode assembly 10 may be increased by decreasing an area of the uncoated portions 11a and 12a and by increasing an area of the coated portions 11b and 12b coated with the active material.

Figure 3B:
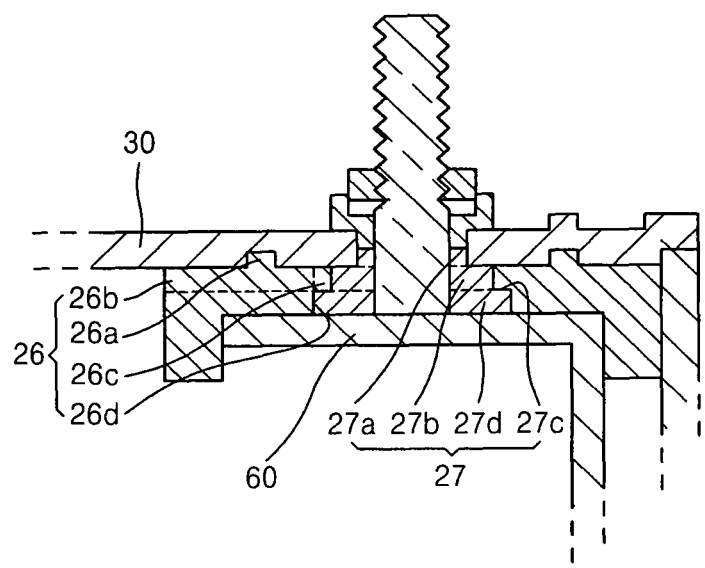
FIG. 3B illustrates an enlarged cross-sectional view of an insulation unit in FIG. 3A.
Figure 4:
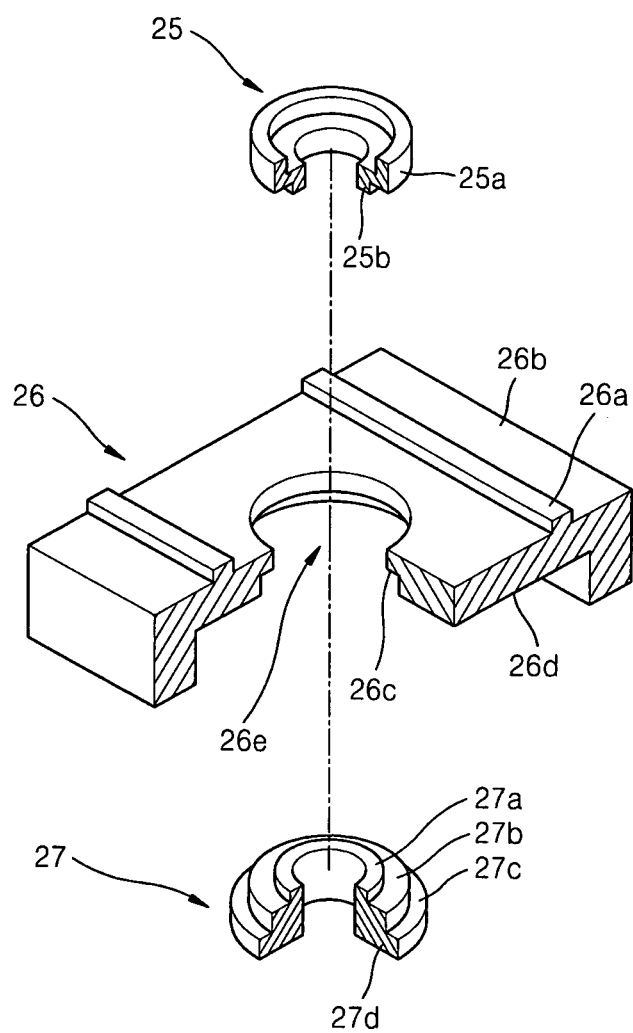
FIG. 4 illustrates a partial, exploded perspective view of an upper gasket, a seal gasket, and an insulation member in the secondary battery of FIG. 1.

FIG. 3B illustrates an enlarged cross-sectional view of an insulation unit in FIG. 3A. FIG. 4 illustrates a partial, exploded perspective view of the insulation unit, i.e., the upper gasket 25, the seal gasket 27 and the insulation member 26, separated from the secondary battery 100 of FIG. 1.

Referring to FIGS. 3B and 4, a portion of the seal gasket 27 may be inserted into a through hole 26e formed in the insulation member 26. Here, the insulation member 26 and the seal gasket 27 may be in surface contact in the through hole 26e of the insulation member 26, thereby sealing the through hole 26e of the insulation member 26. The surface contact between the seal gasket 27 and the insulation member 26 may be via a stepped surface, i.e., non-flat interface, in order to increase a seal area therebetween, so blocking of the electrolyte solution may be improved. In other words, as a seal area between the seal gasket 27 and the insulation member 26 increases and includes a complex geometrical structure, penetration of the electrolyte solution therethrough may be eliminated or substantially decreased. Therefore, a potential contact between the electrolyte solution and the cap plate 30 and/or the electrode terminals 21 and 22 may be prevented or substantially minimized, so an electric short between the cap plate 30 and the electrode terminals 21 and 22 via the electrolyte solution may be prevented or substantially minimized. By preventing the electric short from occurring between the cap plate 30 and the electrode terminals 21 and 22, stability and reliability of the secondary battery 100 may be ensured.

In detail, in the secondary battery 100 according to the present embodiment, the seal gasket 27 may support the insulation member 26 with respect to the cap plate 30. For example, the seal gasket 27 and the insulation member 26 may be arranged, so that a portion of the seal gasket 27 may be parallel to and between, e.g., directly between, the insulation member 26 and the cap plate 30. That is, the seal gasket 27 may support the insulation member 26 while applying pressure to a surface contact therebetween, so that the through hole 26e of the insulation member 26 may be efficiently sealed by the seal gasket 27 and its pressure against the insulation member 26. Thus, it may be possible to prevent the electrolyte solution from reaching the cap plate 30 via the through hole 26e of the insulation member 26.

In contrast, in a conventional secondary battery structure, i.e., a battery not having the structure of the seal gasket 27 with respect to the insulation member 26, an electrolyte solution may flow into a lead member and pass through an insulator hole to the battery cap, thereby electrically connecting the insulation member, the lead member, and the cap plate 30. Therefore, in the secondary battery 100 according to the present embodiment, the structure of the seal gasket 27 may fit into and support the insulation member 26, while applying pressure to the surface contact therebetween, so that the through hole 26e of the insulation member 26 may be sealed. Thus, it may be possible to prevent the electrolyte solution from reaching the cap plate 30 via the through hole 26e of the insulation member 26.

In further detail, as illustrated in FIG. 4, the upper gasket 25 may include a protrusion unit 25a and a terminal hole insert unit 25b on a base portion. The protrusion unit 25a may protrude from the base portion externally outside the cap plate 30, e.g., the protrusion unit 25a may be on and extend away from a surface of the cap plate 30 facing away from an interior of the case 40. The terminal hole insert unit 25b may protrude from the base portion, e.g., to be inserted, into the terminal holes 21a and 22a. In other words, as illustrated in FIG. 4, the protrusion unit 25a and terminal hole insert unit 25b of the upper gasket 25 may be arranged in a stepped structure, e.g., may be substantially perpendicular to the base portion and protrude in opposite direction from the base portion. The upper gasket 25 may extend along an entire perimeter of the terminals holes 21a and 22a. Thus, the upper gasket 25 may be interposed between the cap plate 30 and the electrode terminals 21/22 in the terminal holes 21a/22a, thereby electrically separating the cap plate 30 from the electrode terminals 21 and 22.

As further illustrated in FIGS. 3B and 4, the seal gasket 27 may include a terminal hole insert unit 27a, a cap support unit 27b, a contact unit 27c, and a lead support unit 27d. The contact unit 27c, the cap support unit 27b, and the terminal hole insert unit 27a may be arranged sequentially on the lead support unit 27d.

The terminal hole insert unit 27a may be on the cap support unit 27b, and may be inserted into the terminal holes 21a and 22a. For example, as illustrated in FIG. 3B, the terminal hole insert unit 27a may be inserted into a bottoms of the terminal hole 22a, i.e., from an interior of the case 40, to contact the terminal hole insert unit 25b of the upper gasket 25.

The cap support unit 27b may be connected to the terminal hole insert unit 27a, and may have a surface that is supported by the cap plate 30. For example, bottom surfaces of the terminal hole insert unit 27a and the cap plate 30 may be substantially coplanar, so the cap support unit 27b may be on, e.g., directly on, the bottom surfaces of the terminal hole insert unit 27a and the cap plate 30. For example, the terminal hole insert unit 27a and the cap support unit 27b may be arranged to have a L-shaped cross section on each side of each electrode terminal 21 and 22 in the xz-plane. The cap support unit 27b may be inserted into an upper portion of the through hole 26e of the insulation member 26.

The contact unit 27c and lead support unit 27d, i.e., support bases 27c and 27d, may be connected to the cap support unit 27b, and may be inserted into the through hole 26e of the insulation member 26. The contact unit 27c may be a surface on the support unit 27d that is facing the cap plate 30, and may be substantially parallel to the cap plate 30, i.e., in the xy-plane. When the seal gasket 27 is inserted into the through hole 26e of the insulation member 26, the contact unit 27c may contact, e.g., directly contact, a contact portion of the insulation member 26 to form a surface contact with the insulation member 26. The lead support unit 27d may contact the current collection units 50 and 60, i.e., the terminal lead units 52a and 62a of the lead members 52 and 62, and the insulation member 26. The cap support unit 27b, the contact unit 27c, and the lead support unit 27d may be arranged in a step structure to fit into and support a step-shaped through hole 26e inside the insulation member 26.

That is, the insulation member 26 may include a cap insert unit 26a, a cap support unit 26b, a contact unit 26c, and a lead support unit 26d. The cap support unit 26b may be supported by the cap plate 30, and may include an upper surface, e.g., a substantially flat surface, facing the cap plate 30. The cap insert unit 26a may protrude from the upper surface of the cap support unit 26b, and may be inserted into a support groove 36a that is formed along an inner surface of the cap plate 30.

The contact unit 26c may be stepped in the through hole 26e of the insulation member 26, e.g., the contact unit 26c may extend closer to the electrode terminal 22 inside the through hole 26e relative to the lead support unit 26d, to fit the stepped structure of the support bases 27c and 27d in the seal gasket 27. The lead support unit 26d may define a lower portion of the through hole 26e, and may contact, e.g., directly, the current collection units 50 and 60. The lead support unit 27d of the seal gasket 27 and the lead support unit 26d of the insulation member 26 may respectively contact the terminal lead units 52a and 62a of the current collection units 50 and 60.

For example, the contact unit 26c and the lead support unit 26d may be double-stepped on the same surface inside the through hole 26e in the insulation member 26. That is, when the seal gasket 27 is inserted in the through hole 26e of the insulation member 26, the stepped structure of the inner surface of the through hole 26e may correspond to the stepped structure of the outer surface of the seal gasket 27. Therefore, the terminal hole insert unit 27a of the seal gasket 27 may be inserted through the terminal holes 21a/22a, and the cap support unit 27b of the seal gasket 27 may contact, e.g., directly, the cap plate 30 and a lateral surface of the contact unit 26c of the insulation member 26. Further, the contact unit 27c may contact, e.g., directly, a bottom surface of the contact unit 26c, and the lead support unit 27d may contact, e.g., directly, the lead support unit 26d to fill a step structure defined therebetween.

Here, a contact supporting portion 28 between the seal gasket 27 and the insulation member 26, i.e., a combined stepped surface contact between the contact units 27c and 26c and between the lead support units 26d and 27d, may define a seal area between the seal gasket 27 and the through hole 26e of the insulation member 26. That is, the seal gasket 27 may seal the through hole 26e of the insulation member 26 by the contact supporting portion 28, at which the contact unit 27c of the seal gasket 27 contacts the contact unit 26c of the insulation member 26. Therefore, it may be possible to block the electrolyte solution so as to prevent an electric short between the cap plate 30 and the electrode terminals 21 and 22 via the electrolyte solution. Therefore, increasing stability and reliability of the secondary battery 100.

Figure 5:
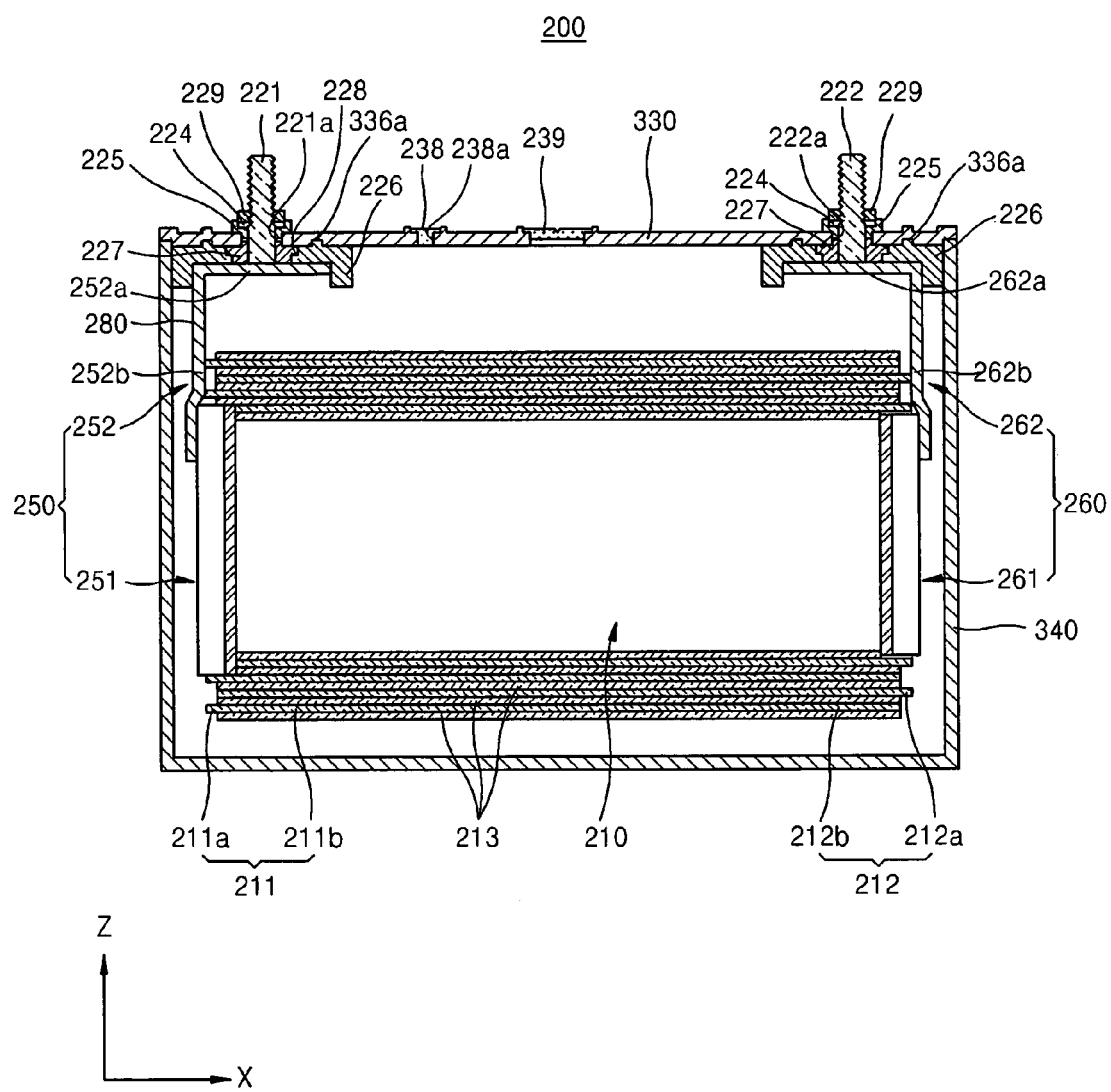
FIG. 5 illustrates a cross-sectional view of a secondary battery according to another embodiment.
Figure 6:
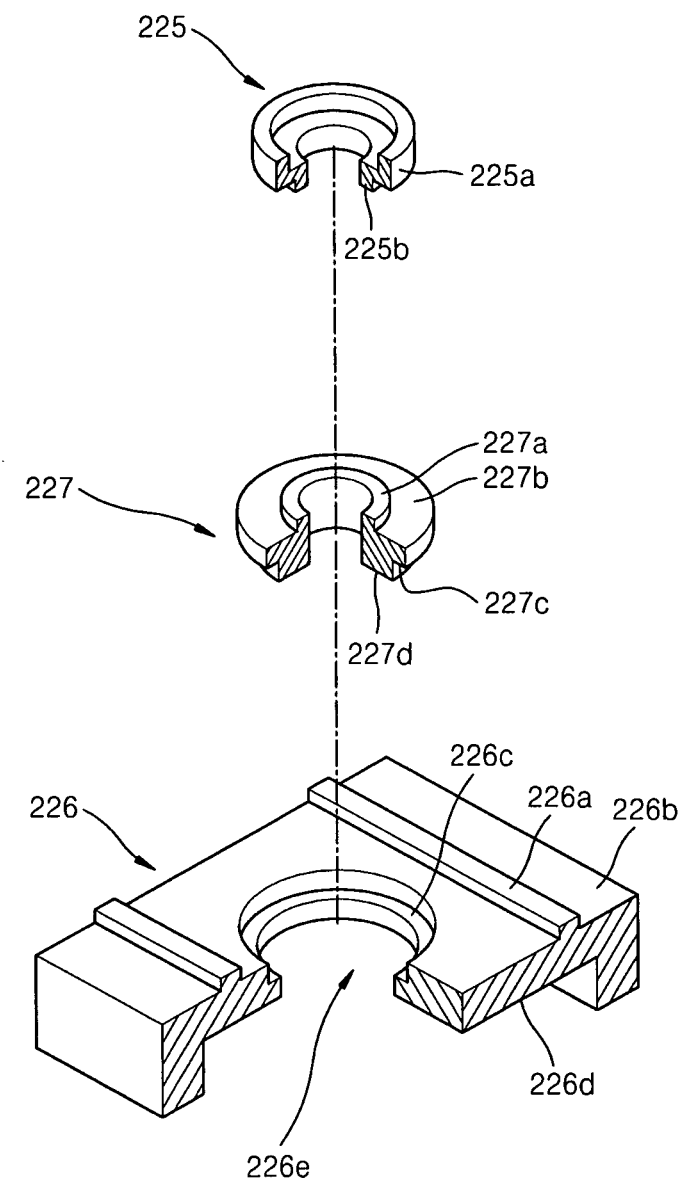
FIG. 6 illustrates a partial, exploded perspective view of an upper gasket, a seal gasket, and an insulation member in the secondary battery of FIG. 5.

FIG. 5 illustrates a cross-sectional view of a secondary battery 200 according to another embodiment. FIG. 6 illustrates a partial, exploded perspective view of an upper gasket 225, a seal gasket 227, and an insulation member 226 in the secondary battery 200 of FIG. 5.

Compared to the secondary battery 100 of FIG. 1, the secondary battery 200 of FIG. 5 may have a substantially same structure, with the exception of having a structure in which the insulation member 226 supports the seal gasket 227 with respect to a cap plate 230. Referring to FIGS. 5 and 6, the secondary battery 200 may include an electrode assembly 210, electrode terminals 221 and 222, a cap plate 230, a case 240, current collection units 250 and 260, the upper gasket 225, the seal gasket 227, and the insulation member 226.

The electrode assembly 210 may be formed, such that anode and cathode plates 211 and cathode 212 may be rolled by interposing a separator 213, i.e., an insulator, therebetween. The case 240 may contain the electrode assembly 210. The electrode terminals 221 and 222 may be referred to as anode terminal 221 and cathode terminal 222, respectively.

The anode terminal 221 and the cathode terminal 222 may be electrically connected to the anode plate 211 and the cathode plate 212 of the electrode assembly 210, respectively, thereby being exposed to the outside of the case 240. The cap plate 230 may be coupled to an opening of the case 240. The current collection units 250 and 260 may include an anode current collection unit 250 and a cathode current collection unit 260, which are electrically connected to the anode plate 211 and the cathode 212, respectively.

A combined structure of the upper gasket 225, the seal gasket 227, and the insulation member 226, i.e., insulation units, may electrically separate the cap plate 230 from the electrode terminals 221 and 222. Here, the combined structure of the upper gasket 225, the seal gasket 227, and the insulation member 226 may block an electrolyte solution so as to prevent an electric short between the cap plate 230 and the electrode terminals 221 and 222 via the electrolyte solution.

The upper gasket 225 may be partially inserted from outside the cap plate 230 into terminal holes 221a and 222a, respectively. The seal gasket 227 may be partially inserted from inside the cap plate 230 into the terminal holes 221a and 222a, respectively. The insulation member 226 may be interposed between the cap plate 230 and the current collection units 250 and 260. Here, the insulation member 226 may electrically separate the cap plate 230 from the current collection units 250 and 260, and the current collection units 250 and 260 may be supported by the cap plate 230 via the insulation members 226. The seal gasket 227 may seal the terminal holes 221a and 222a having the electrode terminals 221 and 222 inserted therein.

In detail, portions of the seal gasket 227 may be respectively inserted into through holes 226e formed in the insulation member 226. Here, the insulation member 226 and the seal gasket 227 may be in surface contact in the through holes 226e of the insulation member 226, respectively, thereby sealing the through holes 226e of the insulation members 226. Thus, it may be possible to block the electrolyte solution so as to prevent an electric short between the cap plate 230 and the electrode terminals 221 and 222 via the electrolyte solution. Accordingly, by preventing the electric short from between the cap plate 230 and the electrode terminals 221 and 222, stability and reliability of the secondary battery 200 may be ensured.

The anode plate 211 may include an anode uncoated portion 211a and an anode coated portion 211b. The cathode 212 may include a cathode uncoated portion 212a and a cathode coated portion 212b. The anode terminal 221 may protrude externally by penetrating the anode terminal hole 221a. The cathode terminal 222 may protrude externally by penetrating the cathode terminal hole 222a.

The cap plate 230 may have an electrolyte solution injection hole 238a formed therethrough, a sealing cap 238 may be inserted into the electrolyte solution injection hole 238a, and a vent member 239 may be mounted in the cap plate 230. The upper and lower gaskets 225 and 227 may be interposed between the cap plate 230 and each of the anode and cathode terminals 221 and 222, thereby insulating the cap plate 230 from the anode and cathode terminals 221 and 222.

Washers 224 for absorbing a coupling force may be arranged on the upper gaskets 225. The anode terminal 221 and the cathode terminal 222 may be coupled to nuts 29 via the washers 224. In another embodiment, the anode terminal 221 and the cathode terminal 222 may be formed as rivet-type electrode terminals.

Anode and cathode current collectors 251 and 261 may be welded to the anode uncoated portion 211a and the cathode uncoated portion 212a of the electrode assembly 210, respectively. The anode and cathode current collectors 251 and 261 may be electrically connected to the anode terminal 221 and the cathode terminal 222, respectively, via anode and cathode lead members 252 and 262. The insulation members 226 may be arranged for insulation between the cap plate 230 and each of the anode and cathode lead members 252 and 262.

The lead members 252 and 262 may include terminal lead units 252a and 262a, and current collection lead units 252b and 262b. The terminal lead units 252a and 262a may be attached to and electrically connected to the electrode terminals 221 and 222. The current collection lead units 252b and 262b may be attached to and electrically connected to the current collectors 251 and 261.

The anode current collection unit 250 may include the anode current collector 251 and the anode lead member 252. The cathode current collection unit 260 may include the cathode current collector 261 and the cathode lead member 262. The anode current collector 251 may be welded to the anode uncoated portion 211a of the electrode assembly 210, and may be electrically connected to the anode terminal 221 via the anode lead member 252. Accordingly, the anode terminal 221 may be connected to the anode plate 211 of the electrode assembly 210 via the anode lead member 252 and the anode current collector 251. Also, the cathode current collector 261 may be welded to the cathode uncoated portion 212a of the electrode assembly 210, and may be electrically connected to the cathode terminal 222 via the cathode lead member 262. Accordingly, the cathode terminal 222 may be connected to the cathode 212 of the electrode assembly 210 via the cathode lead member 262 and the cathode current collector 261.

In the secondary battery 200 according to the present embodiment, the insulation member 226 may support the seal gasket 227 with respect to the cap plate 230. That is, the insulation member 226 may support the seal gasket 227 while applying pressure to a contact surface therebetween, so that it may be possible to efficiently seal the through hole 226e of the insulation member 226. In other words, the seal gasket 227 and the insulation member 226 may be arranged, so that a portion of the seal gasket 227 may be parallel to and between, e.g., directly between, the insulation member 226 and the cap plate 330.

As illustrated in FIG. 6, the upper gasket 225 may include a protrusion unit 225a and a terminal hole insert unit 225b. The protrusion unit 225a may protrude externally outside the cap plate 230. The terminal hole insert unit 225b may be inserted into the terminal holes 221a and 222a. Thus, the upper gasket 225 may be interposed between the cap plate 230, and each of the electrode terminals 221 and 222 that are inserted into the terminal holes 221a and 222a, thereby electrically separating the cap plate 230 from the electrode terminals 221 and 222.

The seal gasket 227 may include a terminal hole insert unit 227a, support bases 227b and 227c, and a lead support unit 227d. The terminal hole insert unit 227a may be inserted into the terminal holes 221a and 222a. The support bases 227b and 227c may be connected to the terminal hole insert unit 227a, and may be inserted into the through hole 226e formed in the insulation member 226. The support bases 227b and 227c may be opposite each other, so a surface of the support base 227b may face and be supported by the cap plate 230 and a surface of the support base 227c may face and be supported by a step formed in the through hole 226e of the insulation member 226. The lead support unit 227d may have one surface connected to the support bases 227b and 227c, and another surface connected to the current collection units 250 and 260 by being exposed through a bottom surface of the insulation member 226.

The insulation member 226 may include a cap support unit 226b, a cap insert unit 226a, a contact unit 226c, and a lead support unit 226d. The cap support unit 226b may be supported by the cap plate 230. The cap insert unit 226a may protrude from a surface of the cap support unit 226b, wherein the surface is supported by the cap plate 230, and may be inserted into a support groove 236a that is formed along an inner surface of the cap plate 230.

The contact unit 226c may be stepped in the through hole 226e of the insulation member 226, thereby supporting the support bases 227b and 227c of the seal gasket 227, e.g., a contact unit 227c. The lead support unit 226d may be stepped in a different manner on an opposite surface of the contact unit 227c in the through hole 226e of the insulation member 226, thereby contacting the current collection units 250 and 260, e.g., the terminal lead units 252a and 262a. Here, the contact unit 226c and the lead support unit 226d may be respectively stepped on opposite surfaces in the through hole 226e.

The support base 227b may be connected to the terminal hole insert unit 227a, and may be inserted into the through hole 226e formed in the insulation member 226 to be supported by the cap plate 230. The contact unit 227c may contact the contact unit 226c of the insulation member 226, thereby sealing the through hole 226e formed in the insulation member 226. Here, the lead support unit 227d of the seal gasket 227 and the lead support unit 226d of the insulation member 226 may respectively contact the terminal lead units 252a and 262a of the lead members 252 and 262.

Here, a contact surface between the contact unit 227c of the seal gasket 227 and the contact unit 226c of the insulation member 226 may be the contact supporting portion 228 at which the seal gasket 227 seals the through hole 226e of the insulation member 226. That is, by the contact supporting portion 228 at which the contact unit 227c of the seal gasket 227a contacts with the contact unit 226c of the insulation member 226, the seal gasket 227a may seal the through hole 226e of the insulation member 226 so that it may be possible to block the electrolyte solution from short circuiting the cap plate 230 and the electrode terminals 221 and 222.

As described above, according to embodiments, a seal gasket may have a stepped structure that fits and corresponds to an inner stepped surface in a through hole 226e of an insulating member between the cap and the lead members. Therefore, the seal gasket and the insulation member may have a stepped surface contact therebetween, thereby preventing penetration of electrolyte solution therethrough. As such, an electric short between the cap plate and the electrode terminals via the electrolyte solution may be prevented or substantially minimized, thereby increasing stability and reliability of the secondary battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    an electrode assembly and an electrolyte solution in a case;
    a current collection unit in the case and electrically connected to the electrode assembly;
    a cap plate coupled to an open side of the case for sealing the case;
    an electrode terminal penetrating the cap plate through a terminal hole to be exposed to an exterior of the case, the electrode terminal being electrically connected to the current collection unit; and
    an insulation unit separating the cap plate from the electrode terminal and the current collection unit, the insulation unit being configured to block penetration of the electrolyte solution therethrough toward the cap plate, wherein the insulation unit includes:
    an upper gasket partially inserted from outside the cap plate into the terminal hole;
    a seal gasket that has a first stepped surface structure, an upper portion of the first stepped surface structure being inserted from inside the cap plate into the terminal hole and a lower portion of the first stepped surface structure being adjacent to an insulation member of the insulation unit, the seal gasket including:
        a terminal hole insert unit of the first stepped surface structure inserted into the terminal hole,
        a cap support unit of the first stepped surface structure connected to the terminal hole insert unit and inserted into a through hole of the insulation member, the cap support unit having an upper surface contacting the cap plate and a side surface contacting the insulation member, the side surface of the cap support unit being adjacent to the upper surface, and
        a support base of the first stepped surface structure connected to the cap support unit, the support base having a side surface contacting the insulation member and a lower surface contacting the current collection unit, the side surface of the support base being adjacent to the lower surface and being spaced apart from the side surface of the cap support unit to have a step difference between the cap support unit and the support base at opposite surfaces of the seal gasket, and
    the insulation member of the insulation unit including a second stepped surface structure and being interposed between the cap plate and the current collection unit, the second stepped surface structure being adjacent to the lower portion of the first stepped structure of the seal gasket,
    a portion of the seal gasket being between the insulation member and the cap plate, and the opposite surfaces of the seal gasket contacting the insulation member and the cap plate.

2. The secondary battery as claimed in claim 1, wherein the lower portion of the first stepped surface structure of the seal gasket contacts the second stepped surface of the insulation member.

3. The secondary battery as claimed in claim 1, wherein opposite surfaces of the insulation member contact the seal gasket and the cap plate.

4. A secondary battery, comprising:
    an electrode assembly and an electrolyte solution in a case;
    a current collection unit in the case and electrically connected to the electrode assembly;
    a cap plate coupled to an open side of the case for sealing the case, the cap plate including a terminal hole defined by an opening extending through the cap plate;
    an electrode terminal penetrating the cap plate through the terminal hole to be exposed to an exterior of the case, the electrode terminal being electrically connected to the current collection unit; and
    an insulation unit separating the cap plate from the electrode terminal and the current collection unit, the insulation unit being configured to block penetration of the electrolyte solution therethrough toward the cap plate, wherein the insulation unit includes:
    an upper gasket partially inserted from outside the cap plate into the terminal hole;
    a seal gasket partially inserted from inside the cap plate into the terminal hole, the seal gasket having a first stepped surface structure including a terminal hole insert unit inserted into the terminal hole, a cap support unit connected to the terminal hole insert unit and inserted into a through hole of an insulation member of the insulation unit, the cap support unit being outside the terminal hole and having a surface contacting the cap plate, and a support base connected to the cap support unit, the support base having a first surface contacting the insulation member and a second surface contacting the current collection unit; and
    the insulation member of the insulation unit being interposed between the cap plate and the current collection unit, the insulation member having a second stepped surface structure and the insulation member including:
- a cap support unit contacting the cap plate,
- a cap insert unit inserted into a support groove on an inner surface of the cap plate,
- a contact unit having a stepped surface defining opposing sides of the through hole of the insulation member, the stepped surface of the contact unit being outside the terminal hole and contacting the first surface of the support base of the seal gasket, and
- a lead support unit having another stepped surface defining the opposing sides of the through hole of the insulation member, the other stepped surface of the lead support unit being outside the terminal hole and contacting the current collection unit.

5. The secondary battery as claimed in claim 1, wherein the support base includes:
- a contact unit contacting the insulation member and sealing the through hole in the insulation member; and
- a lead support unit contacting the current collection unit.

6. A secondary battery, comprising:
- an electrode assembly and an electrolyte solution in a case;
- a current collection unit in the case and electrically connected to the electrode assembly;
- a cap plate coupled to an open side of the case for sealing the case;
- an electrode terminal penetrating the cap plate through a terminal hole to be exposed to an exterior of the case, the electrode terminal being electrically connected to the current collection unit; and
- an insulation unit separating the cap plate from the electrode terminal and the current collection unit, the insulation unit being configured to block penetration of the electrolyte solution therethrough toward the cap plate, wherein the insulation unit includes:
  - an upper gasket partially inserted from outside the cap plate into the terminal hole;
  - a seal gasket partially inserted from inside the cap plate into the terminal hole, the seal gasket including:
    - a terminal hole insert unit inserted into the terminal hole,
    - a support base connected to the terminal hole insert unit and inserted into a through hole in an insulation member of the insulation unit, the support base having a first stepped surface defining opposite surfaces of the seal gasket, an upper surface of the support base contacting the cap plate outside of the terminal hole, and opposite side surfaces of the support base contacting a stepped surface structure defining the through hole of the insulation member, and
    - a lead support unit having an upper surface contacting the support base, a lower surface contacting the current collection unit, and opposite side surfaces contacting the stepped surface structure defining the through hole of the insulation member, the lead support unit having a second stepped surface defining the opposite surfaces of the seal gasket, and
  - the insulation member of the insulation unit being interposed between the cap plate and the current collection unit, the insulation member being entirely under the cap plate.

7. The secondary battery as claimed in claim 6, wherein the insulation member includes:
- a cap support unit contacting the cap plate;
- a cap insert unit on the cap support unit and inserted into a support groove on an inner surface of the cap plate;
- a contact unit in the through hole of the insulation member and contacting the support base of the seal gasket; and
- a lead support having a stepped structure on an opposite surface of the contact unit in the through hole of the insulation member and contacting the current collection unit.

8. The secondary battery of claim 6, wherein the support base includes:
- a cap support unit connected to the terminal hole insert unit, inserted into the through hole in the insulation member, and supported by the cap plate; and
- a contact unit contacting the insulation member.

9. The secondary battery as claimed in claim 1, wherein a portion of each of the seal gasket and the insulation member contacts directly the current collection unit.

10. The secondary battery as claimed in claim 1, wherein the lower portion of the first stepped surface structure of the seal gasket and the second stepped surface structure of the insulation member fit into each other.

11. The secondary battery as claimed in claim 1, wherein the seal gasket is in direct contact with the insulation member, the cap plate, the electrode terminal, and the current collection unit.

12. The secondary battery as claimed in claim 1, wherein at least one surface contact between the seal gasket and the insulation member is in a plane substantially parallel to the cap plate.

13. The secondary battery as claimed in claim 1, wherein:
- the opposite surfaces of the seal gasket structure have the first stepped surface structure,
- the second stepped surface structure of the insulation member contacts both of the opposite surfaces of the seal gasket structure having the first stepped surface structure, and
- the second stepped surface structure of the insulation member is entirely below cap plate.

14. The secondary battery as claimed in claim 4, wherein:
- the first surface of the support base of the seal gasket is an upper surface that faces the cap plate, and the second surface of the support base of the seal gasket is a lower surface,
- the lead support unit of the insulation member contacts opposite sides surfaces of the support base of the seal gasket, the opposite side surfaces being between the first and second surfaces of the support base of the seal gasket, and
- the contact unit of the insulation member contacts opposite side surfaces of the cap support unit of the seal gasket, the opposite side surfaces being adjacent to a surface of the cap support unit contacting the cap plate, and the opposite side surfaces being spaced apart from the opposite side surfaces of the support base of the seal gasket.

* * * * *